United States Patent
Upchurch

[11] 3,897,756
[45] Aug. 5, 1975

[54] TANDEM ROTOR ROTARY ENGINE

[76] Inventor: Lewis E. Upchurch, 31 Reservoir Ave., Revere, Mass. 02151

[22] Filed: July 9, 1973

[21] Appl. No.: 377,213

[52] U.S. Cl. .............................. 123/8.23; 418/195
[51] Int. Cl. ............................................. F02b 53/08
[58] Field of Search ................ 123/8.01, 8.23, 8.41; 418/195; 251/304, 314

[56] References Cited
UNITED STATES PATENTS

| 1,012,616 | 12/1911 | Dubus | 418/195 X |
| 1,607,827 | 11/1926 | Herrmann | 251/304 X |
| 2,273,625 | 2/1942 | Concannon | 123/8.41 |
| 3,361,119 | 1/1968 | Foxley-Connolly | 123/8.23 |
| 3,502,054 | 3/1970 | Hambric | 123/8.09 X |

FOREIGN PATENTS OR APPLICATIONS

| 3,431 | 2/1909 | United Kingdom | 123/8.41 |
| 1,401,407 | 10/1968 | Germany | 123/8.41 |
| 625,277 | 9/1961 | Italy | 123/8.23 |

Primary Examiner—C. J. Husar
Assistant Examiner—Leonard Smith
Attorney, Agent, or Firm—James E. Mrose

[57] ABSTRACT

A rotary engine utilizing two rotors mounted in tandem on a drive shaft in separate chambers. The rotors carry vanes which sweep the walls of the chambers. Disk gates rotating around axes perpendicular to the drive shaft divide the chambers into two sections and are slotted to permit the vanes to pass through. The engine is four cycle in operation. Intake and compression take place behind and ahead of the vanes in the first chamber, and expansion and exhaust take place behind and ahead of the vanes in the second chamber. Compressed gas from the first chamber is transferred to a separate combustion chamber where combustion is initiated, and the expanding gas is transferred to the second rotor chamber.

5 Claims, 7 Drawing Figures

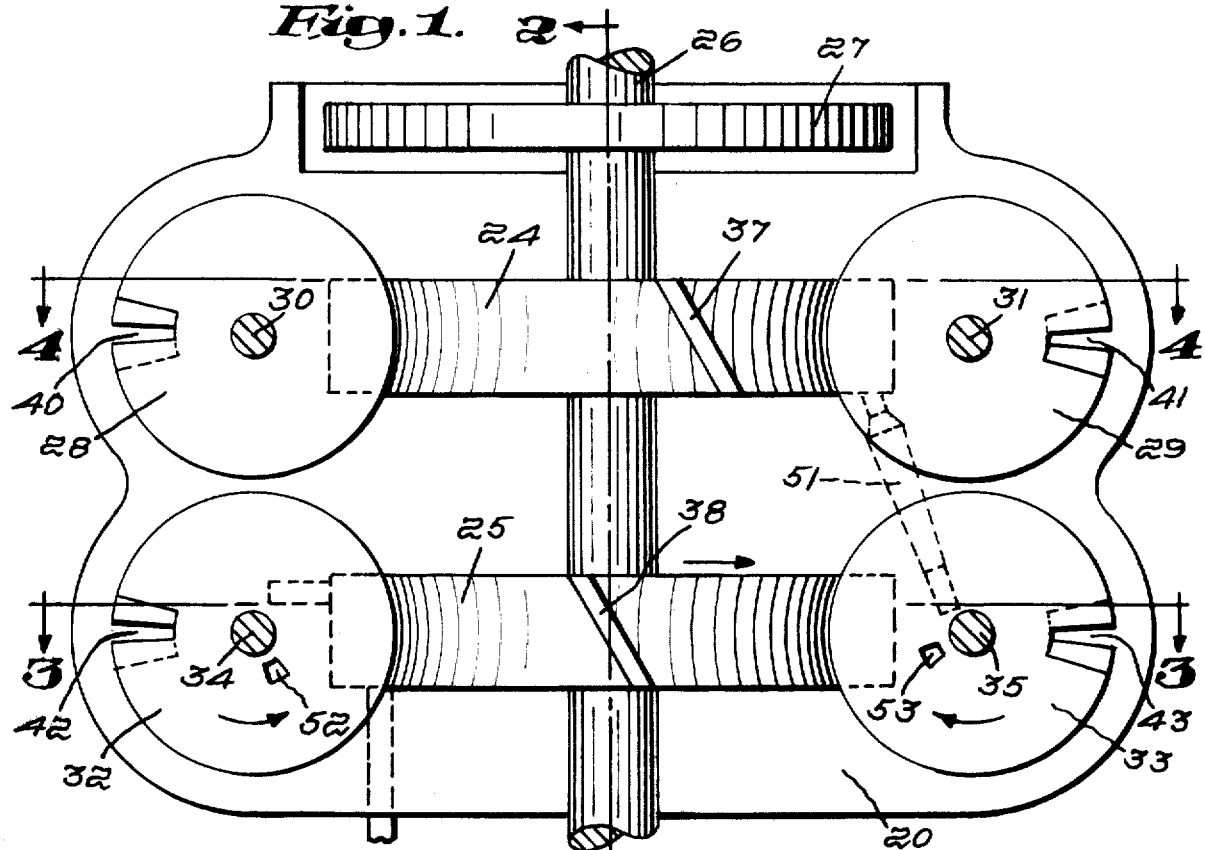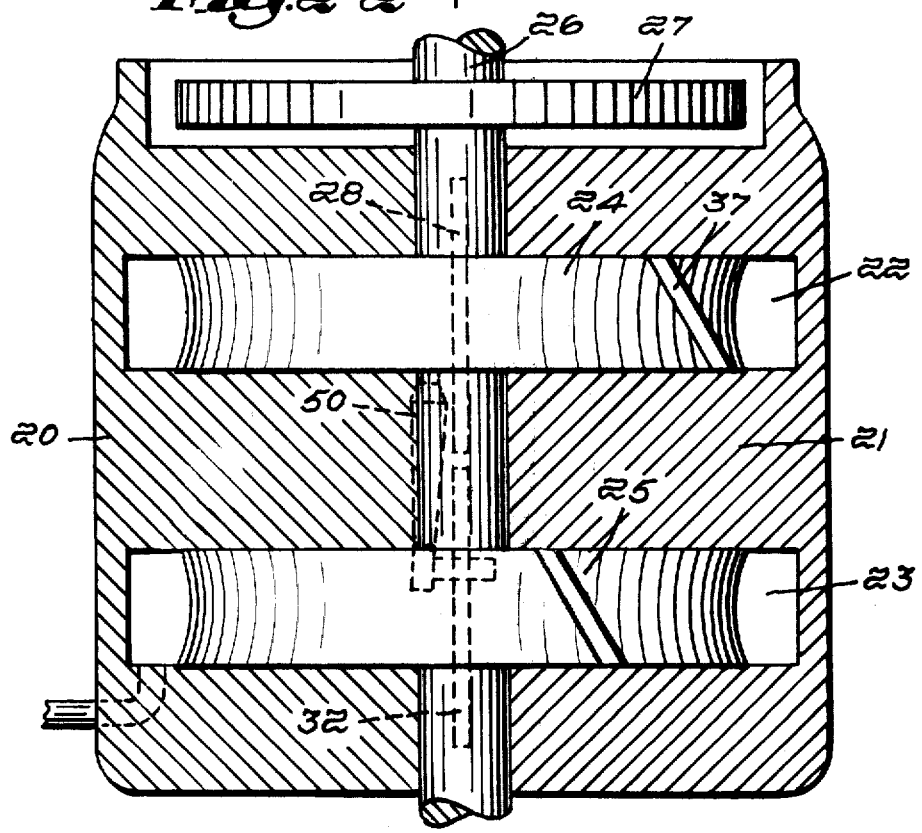

3,897,756

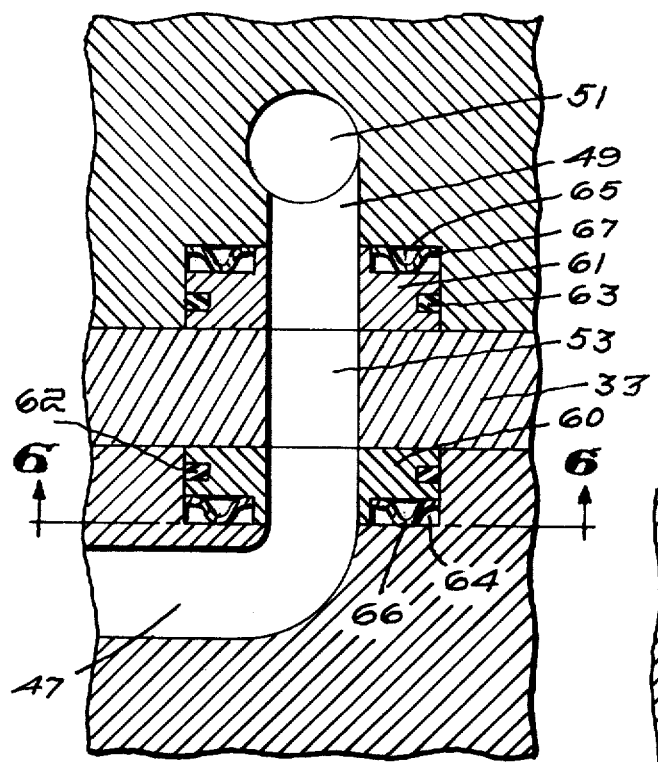
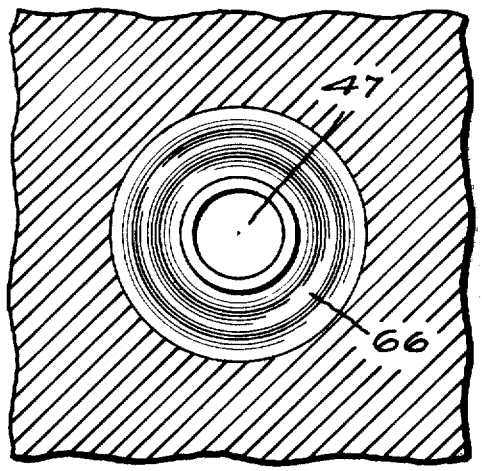
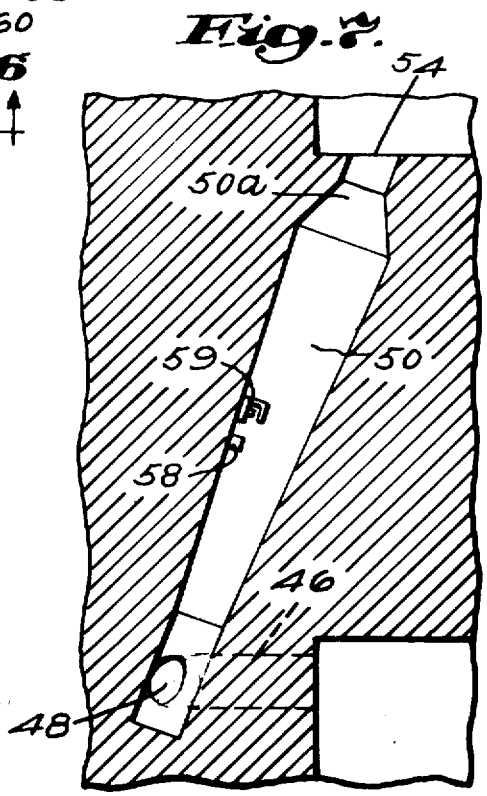

TANDEM ROTOR ROTARY ENGINE

This invention relates to internal combustion engines of the type generally referred to as rotary, because they have no reciprocating main parts, and pertains more particularly to improvements in an engine of the type disclosed in my previous U.S. Pat. No. 3,413,962, dated Dec. 3, 1968.

BACKGROUND OF THE INVENTION

The engine shown in my aforesaid previous patent utilizes a single rotor chamber for all four phases of the operating cycle. In its simplest form, the engine has a pair of disk gates which divide the rotor chamber into two sections. Intake and compression take place in one half of the rotor chamber. The compressed fuel mixture is transferred and stored in an accumulator chamber, and a charge is released at the proper time into the other half of the rotor chamber, where combustion and exhaust take place.

The principal object of this invention is to provide an engine with more efficient combustion and cleaner exhaust characteristics, to permit flexiblilty in designing the ratios of compression and expansion, to produce a balance in the radial loads on the drive shaft, and to minimize the problem of leakage from the combustion region to other regions of the engine. Other objects, advantages, and novel features will be apparent from the following description.

SUMMARY

The engine here disclosed has two rotors mounted in tandem on a drive shaft in separate chambers. Each rotor carries a pair of oppositely disposed vanes which sweep the walls of the chambers. Mounted on opposite sides of each rotor chamber are disk gates which rotate in synchronization with the drive shaft on axes perpendicular to the drive shaft. The gates extend into the rotor chambers to the side walls of the rotors, which are concave. The gates divide the area around each rotor into two sections. The sections of the first chamber are connected to air or fuel mixture intakes so that air or mixture is drawn in behind a vane passing through each section and simultaneously gas previously drawn in is compressed ahead of the vanes. Combustion chambers are disposed on either side of the rotor chambers and communicate with the sections of the second rotor chamber. Near the end of the vane travel between the gates in the first rotor chamber, ports in the gates line up with outlets from the compression areas of that chamber and allow the compressed gas to pass into the combustion chambers. The gas is ignited in the combustion chambers and travels into the expansion areas behind the vanes in the second rotor chamber to provide a drive stroke. Simultaneously the previously burned gases are exhausted ahead of the vanes in the second rotor chamber.

DESCRIPTION OF THE DRAWINGS

In the drawings illustrating the invention:

FIG. 1 is a top plan view of an engine constructed according to the invention with the upper part of the housing removed;

FIG. 2 is a cross-section taken along line 2—2 of FIG. 1;

FIG. 5 is an enlarged fragmentary cross-section taken in the region of one of the gate ports at the time of transfer of the compressed gas to a combustion chamber;

FIG. 6 is a cross-section taken along line 6—6 of FIG. 5; and

FIG. 7 is an enlarged fragmentary cross-section taken along line 7—7 of FIG. 4.

DESCRIPTION OF THE PREFERRED EMBODIMENT

Figure 3:
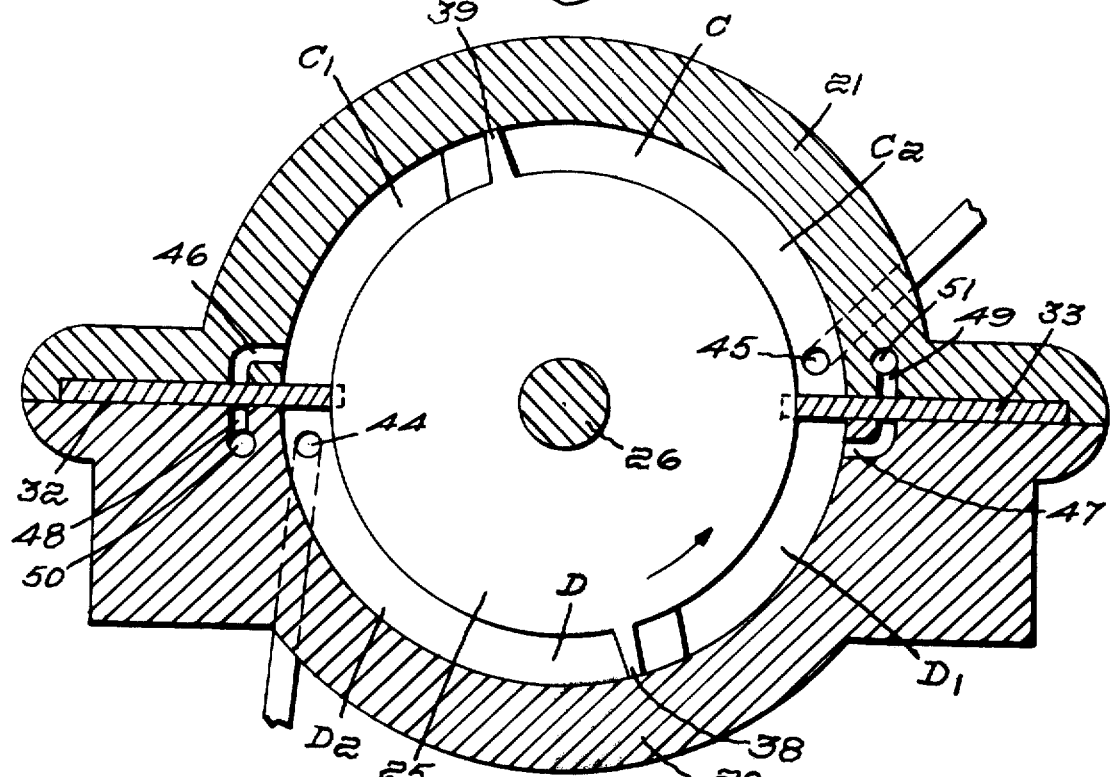
FIG. 3 is a cross-section taken along line 3—3 of FIG. 1.

Referring to FIGS. 1 and 2, the engine has a housing formed by a lower section 20 and an upper section 21. The sections are hollowed out to form two cylindrical chambers 22 and 23. A rotor 24 is mounted in chamber 22, and another rotor 25 is mounted in chamber 23. A drive shaft 26 runs through the housing and is connected to the rotors. The housing is recessed at the rear end to receive a flywheel 27 which is also mounted on the drive shaft. It is understood that the drive shaft is supported by suitable bearings (not shown).

Figure 4:
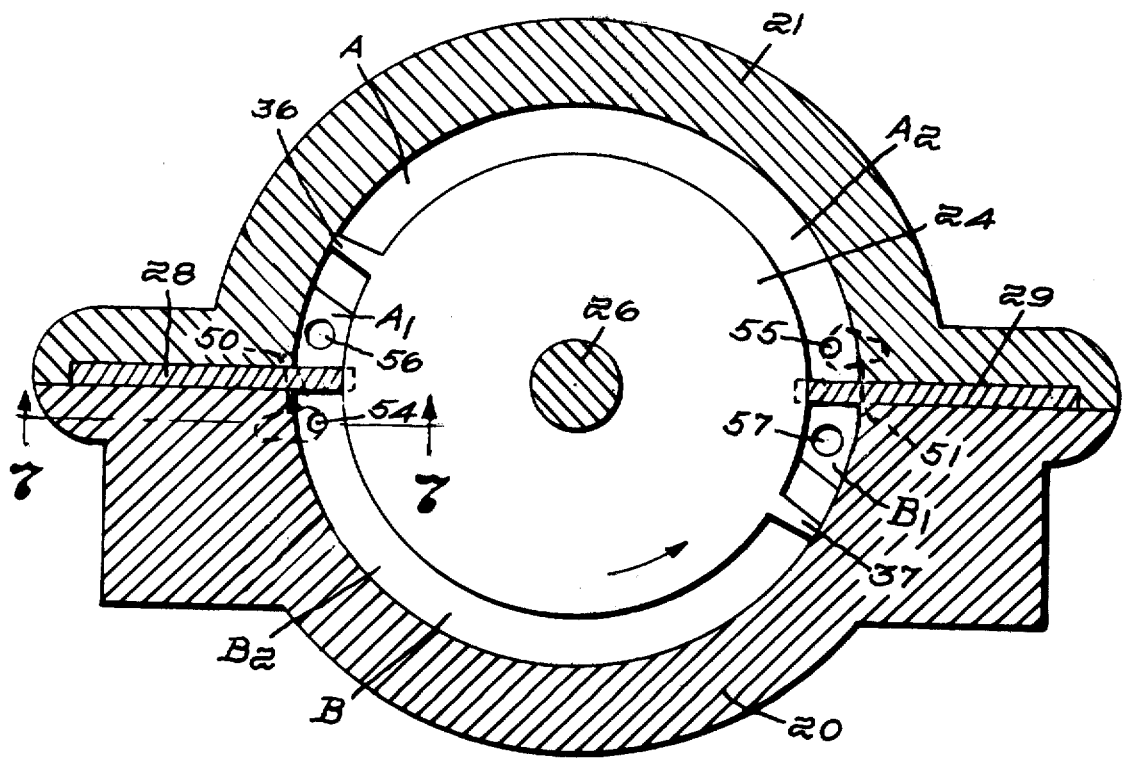
FIG. 4 is a cross-section taken along line 4—4 of FIG. 1.

Disk gates 28 and 29 are mounted in the housing on opposite side of rotor 24, and are driven by shafts 30 and 31 mounted perpendicular to the drive shaft 26. Disk gates 32 and 33 are mounted in the housing one opposite sides of rotor 25, and are driven by shafts 34 and 35 mounted perpendicular to shaft 26. The gates are all driven by gearing or other suitable power take off (not shown) from the drive shaft 26. The rotors have concave circumferential walls of suitable radius to provide close sliding engagement with the rims of the gates. It is understood that the rims are provided with suitable seals (not shown) to maintain substantially air tight contact with the circumferential walls of the rotors. Gates 28 and 29 thus divide the space in chamber 22 around rotor 24 into two sections A and B (FIG. 4) and gates 32 and 33 divide the space in chamber 23 around rotor 25 into two sections C and D.

Rotor 24 carries a pair of oppositely disposed vanes 36 and 37, and rotor 25 carries a similar pair of vanes 38 and 39. The vanes sweep the side walls of the respective rotor chambers and are provided with suitable sealing means all around to main substantially air tight engagement with the side walls and end walls of the chambers. The vanes thus divide the sections of the rotor chambers between the gates in sub-sections A1, A2, B1, B2, C1, C2, and D1, D2. Gates 28 and 29 have slots 40 and 41 which enter the chamber 22 at the proper time to permit vanes 36 and 37 to pass through the gates, and gates 32 and 33 have slots 42 and 43 which similarly allow vanes 38 and 39 to pass through. As explained in my previous patent, the vanes are disposed at an angle with respect to the drive shaft and the slots are similarly sloped to minimize the opening required in the gates.

Rotor 25 performs the intake and compression phases of the cycle. Intake ports 44 and 45 are located just ahead of gates 32 and 33 in sections D and C of rotor chamber 22. The engine specifically shown here is design to operate on the fuel injection principle, and the intake in this case is air, but it is understood that a fuel and air mixture intake from a suitable carburetion source may be used. Outlet conduits 46 and 47 communicate with sections C and D just behind the gates 32 and 33. Ducts 48 and 49, disposed in the housing ahead of gates 32 and 33, lead to combustion chambers 50 and 51 disposed in the housing. Gates 32 and 33 are provided with ports 52 and 53 which come into register with conduit 46 and duct 48 and conduit 47 and duct 49, respectively, as the vanes 38 and 39 approach the gates.

Combustion chambers 50 and 51 communicate with sections B and A of rotor chamber 22 just ahead of gates 28 and 29, respectively, through ports 54 and 55. Exhaust ports 56 and 57 are disposed in sections A and B just behind gates 28 and 29. Combustion chamber 50, shown in detail in FIG. 7, consists of a tapered cylindrical chamber in the housing, with a reduced mouth portion 50a leading to port 54. Duct 48 lead into the chamber 50 near the bottom in a tangential manner to produce a swirling motion in the compressed air entering the chamber. A fuel injection nozzle 58 and spark plug 59 are located in chamber 50. Chamber 51 is in all respects a duplicate of chamber 50.

As illustrated in FIG. 5, the housing is recessed around conduit 47 and duct 49 to receive a pair of seal rings 60 and 61. Compression rings 62 and 63 seal rings 60 and 61 to the housing at the sides. Rings 60 and 61 have end recesses 64 and 65 in which bellows springs 66 and 67 are received. The springs bear on the housing and rings 60 and 61 and compensate for wear on the rings which are in frictional sliding engagement with gate 33. A similar set of seal assemblies is provided around conduit 46 and duct 48.

OPERATION

Rotation of the engine is started by suitable external means. As vanes 38 and 39 sweep sections C and D of chamber 22, air is drawn in through ports 44 and 45 behind the vanes into sub-sections C2 and D2. At the same time, air drawn in on the previous half revolution is compressed in sub-sections C1 and D1. As the vanes approach the gates, ports 52 and 53 come into register with conduit 46 and duct 48 and conduit 47 and duct 49 respectively, allowing the compressed air from sub-sections C1 and D1 to flow into the combustion chambers 50 and 51.

Vanes 36 and 37 lead vanes 38 and 39 enough so that vanes 36 and 37 have passed through gates 28 and 29 and cleared ports 54 and 55 by the time compressed air is admitted from sub-sections C1 and D1 to the combustion chambers. Fuel is injected and the mixture ignited in the combustion chambers. The ignited mixture expands into sub-sections A2 and B2, driving rotor 24. At the same time the spent mixture from the previous half revolution is exhausted from sub-sections A1 and B1 through ports 56 and 57.

This engine delivers two power strokes for each half revolution, twice as many as the single rotor engine disclosed in my previous patent. The rotor size for a given horsepower can be reduced accordingly. The two power strokes occur at the same time on opposite sides of the rotor, so that the major radial loads on the drive shaft are balanced. This produces a smoother running engine and reduces wear on the main bearings.

By making the tandem rotors and their chambers of different sizes, any desired differential between the expansion and compression ratios can be readily achieved. For example, by making rotor 24 and chamber 22 larger than rotor 25 and chamber 23, the engine may be made to operate on the over expansion principle, thus more fully utilizing the expansion force and producing a quieter exhaust.

The type of combustion produced in this engine is particularly favorable to effective and complete combustion and thus a cleaner exhaust. The swirling movement of the compressed air entering the combustion chamber produces stratification by driving the fuel particles toward the wall of the chamber so that combustion is initiated in a rich mixture and progresses to a leaner mixture.

The combustion and expansion areas are isolated from the compression area except during the brief period when ports 52 and 53 are aligned with the transfer ducts. At that time the compressed air is being driven into and through the combustion chambers by vanes 38 and 39. Any ignited mixture which escapes into the compression areas will likewise be driven into the combustion areas by the vanes.

Sealing problems are minimized in this engine. The only critical seals exposed to high temperatures are those around ports 52 and 53. It is not necessary to maintain an airtight seal between the vanes and the gates while the vanes are passing through the slots. When vanes 38 and 39 are passing through gates 32 and 33 most of the air from the compression areas has been transferred to the combustion chambers and ports 52 and 53 have closed. It is immaterial whether a small amount of residual air in the compression areas leaks into the intake areas. When vanes 36 and 37 are passing through gates 28 and 29, the expansion cycle has been completed and a new charge has not yet been admitted to the combustion areas. Residual gas in the expansion areas is about to be exhausted during the next half revolution in any case, so that leakage from the expansion areas back through the gates to the nearest exhaust port is of no consequence at this point in the cycle. A considerable tolerance can be allowed between the slots and the vanes, thus eliminating a manufacturing problem.

It is understood that the example here described is the most practical basic form of the engine. The engine would operate with a single vane and gate in each rotor chamber, but the radial load balancing feature would be sacrificed. If shorter and more numerous power strokes per revolution are advantageous for a particular use, two or more pairs of vanes, or alternatively, two or more pairs of gates can be used for each rotor, with an appropriate number of combustion chambers.

What is claimed is:

1. A rotary engine comprising: a housing enclosing a first rotor chamber and a second rotor chamber; a drive shaft passing through said chambers; a first rotor disposed in said first rotor chamber and a second rotor disposed in said second rotor chamber, said rotors being disposed in tandem on said drive shaft, and each rotor having a generally radially projecting vane sweeping its respective chamber; a first rotary gate projecting into said first rotor chamber and a second rotary gate projecting into said second rotor chamber, each of said gates having an aperture to permit passage of its respective vane, said rotors and gates being driven in synchronization with said drive shaft to bring the apertures into the respective chambers so as to allow each vane to pass therethrough, an intake opening and an outlet opening disposed on opposite sides of said first gate and communicating with said first rotor chamber, an inlet opening and an exhaust opening disposed on opposite sides of said second gate and communicating with said second rotor chamber, a combustion chamber in the housing between the two rotor chambers, said combustion chamber having a receiving end and a discharge end with the chamber tapering outwardly from the receiving end, the discharge end of the combustion chamber leading into said second rotor chamber through said inlet opening thereby introducing the expanding fluid into the second rotor chamber, transfer means for periodically connecting the receiving end of said combustion chamber to said outlet opening to tangentially introduce compressed fluid into said receiving end, and means in said combustion chamber for initiating combustion.

2. A rotary engine as described in claim 1, said transfer means comprising a conduit in said housing leading from said outlet opening to said first gate, a duct in said housing leading from said receiving end of the first gate to said combustion chamber, and a port in said first gate disposed to line up with and connect said conduit and said duct as the vane of said first rotor approaches said first gate.

3. A rotary engine as described in claim 1, said transfer means comprising a conduit in said housing leading from said outlet opening to said first gate, a duct in said housing leading from said receiving end of the first gate to said combustion chamber, a port in said first gate disposed to line up with and connect said conduit and said duct as the vane of said first rotor approaches said first gate, a first seal ring surrounding said conduit and bearing against said first gate, a second seal ring surrounding said duct and bearing against said first gate, and spring urging said rings toward said first gate.

4. A rotary engine as described in claim 8 having fuel injection means (and ignition means) disposed in said combustion chamber.

5. A rotary engine as described in claim 1, having a third rotary gate provided with an aperture and projecting into said first rotor chamber opposite said first gate, a fourth rotary gate provided with an aperture and projecting into said second rotor chamber, a second intake opening and, a second outlet opening disposed on opposite sides of said third gate and communicating with said first rotor chamber, a second inlet opening and a second exhaust opening disposed on opposite sides of said fourth gate and communicating with said second rotor chamber, a second combustion chamber in the housing between the two rotor chambers, said second combustion chamber having a receiving end and a discharge end with the chamber tapering outwardly from the receiving end, the discharge end of the second combustion chamber leading into said second rotor chamber through said second inlet opening thereby introducing the expanding fluid into the second rotor chamber, second transfer means for periodically connecting the receiving end of the second combustion chamber to said second outlet opening to tangentially introduce compressed fluid into the receiving end of the second combustion chamber, and each rotor having a pair of oppositely disposed generally radially projecting vanes sweeping the respective rotor chambers.

* * * * *